US007739179B2

(12) United States Patent
Cross (10) Patent No.: US 7,739,179 B2
(45) Date of Patent: *Jun. 15, 2010

(54) SYSTEM AND METHOD FOR SELECTING SECURITIES FOR INVESTMENT

(76) Inventor: Joseph H. Cross, 902 Beaverbrook Dr., Atlanta, GA (US) 30318

(*) Notice: Subject to any disclaimer, the term of this patent is extended or adjusted under 35 U.S.C. 154(b) by 0 days.

This patent is subject to a terminal disclaimer.

(21) Appl. No.: 12/259,568

(22) Filed: Oct. 28, 2008

(65) Prior Publication Data

US 2009/0157564 A1 Jun. 18, 2009

Related U.S. Application Data

(63) Continuation of application No. 10/212,014, filed on Aug. 2, 2002, now Pat. No. 7,457,775.

(60) Provisional application No. 60/309,820, filed on Aug. 3, 2001.

(51) Int. Cl.
*G06Q 40/00* (2006.01)
(52) U.S. Cl. .......................... 705/36 R; 705/35; 705/37
(58) Field of Classification Search .................. 705/35, 705/36, 37
See application file for complete search history.

(56) References Cited

U.S. PATENT DOCUMENTS

| | | | |
|---|---|---|---|
| 5,806,047 A | 9/1998 | Hackel et al. | |
| 5,911,135 A | 6/1999 | Atkins | |
| 5,911,136 A | 6/1999 | Atkins | |
| 5,946,667 A | 8/1999 | Tull, Jr. et al. | |
| 5,978,778 A | 11/1999 | O'Shaughnessy | |
| 5,999,917 A | 12/1999 | Facciani et al. | |
| 6,018,722 A | 1/2000 | Ray et al. | |
| 6,029,148 A | 2/2000 | Zurstrassen | |
| 6,055,517 A | 4/2000 | Friend et al. | |
| 6,061,663 A | 5/2000 | Bloom et al. | |
| 6,064,985 A | 5/2000 | Anderson | |
| 6,078,904 A | 6/2000 | Rebane | |

(Continued)

FOREIGN PATENT DOCUMENTS

WO       WO 00/51043       8/2000

OTHER PUBLICATIONS

McNaughton, David. "Screen for Ga. Value Stocks Yields Several Candidates," The Atlanta Journal-Constitution, (Jan 3, 2000), p. S.4.*

(Continued)

*Primary Examiner*—Kambiz Abdi
*Assistant Examiner*—Elizabeth H Rosen
(74) *Attorney, Agent, or Firm*—Kilpatrick Stockton LLP (57) ABSTRACT

A system and method for automated selection of securities within an index for purchase or sale. The system and method according to certain embodiments of the present invention select securities within and index for purchase based on the percentage differential of the price of each security within the index and the 52-week high price. A target sell price is determined based on a pre-selected percentage increase of over the purchase price of the selected security. Once the market price of the selected security reaches the target sell price, the system and method according to certain embodiments of the present invention sells the selected security. The proceeds of the sale of the selected security may be reinvested according to the second selected security within the index.

12 Claims, 10 Drawing Sheets

U.S. PATENT DOCUMENTS

| | | | |
|---|---|---|---|
| 6,317,728 | B1 | 11/2001 | Kane |
| 6,594,643 | B1 | 7/2003 | Freeny, Jr. |
| 7,181,425 | B1 | 2/2007 | Cha |
| 2002/0116310 | A1* | 8/2002 | Cohen et al. .................. 705/36 |
| 2002/0123952 | A1 | 9/2002 | Lipper |
| 2002/0152144 | A1* | 10/2002 | Kamper et al. ................ 705/35 |

OTHER PUBLICATIONS

Pauly, Heather "Investors Push 3 Indexes to Records. Climbing to New Heights." Chicago Sun-Times (Jan. 7, 1999), p. 46.

Antilla, Susan "Investing: Good for G.M., but Bad for Buyers of Its Offer," New York Times (Dec. 19, 1992), p. 1.35.

Vickers, Marcia "The Art of Swimming Against the Tide," New York Times (Mar. 22, 1998), p. 3.6.

"Stock Watch," Pump Industry Analyst (Feb. 2001), p. 10.

Edwards, David "Trading Rules to Live By," TheStreet.com (Jun. 7, 2001).

"The Durable Dow," John A. Prestbo, Markets Editor, The Wall Street Journal.

* cited by examiner

| Purchase Date | Ticker | Company | Purchase Price | # of Shares | Basis | Target Price | Sell Date | Sell Price | Transaction Total | Profit | Dividends Per Share (or Range) | Total Dividends | Price as of 12/31/99 | Market Value as of 12/31/99 | Gain/loss as of 12/31/99 |
|---|---|---|---|---|---|---|---|---|---|---|---|---|---|---|---|
| 15-Jan-1985 | t | AT&T CORP COM | $13.67 | 732 | $10,000.00 | $16.40 | 17-Dec-1985 | $16.42 | $12,012.20 | $2,012.20 | 0.60 | $439.02 | | | |
| 17-Dec-1985 | tx | TEXACO INC COM | $13.81 | 870 | $12,012.20 | $16.58 | 24-Apr-1986 | $16.63 | $14,458.12 | $2,445.92 | 0.38 | $326.12 | | | |
| 24-Apr-1986 | 90399Y93 | USX CORP COM | $20.25 | 714 | $14,458.12 | $24.30 | 19-Sep-1988 | $24.63 | $17,581.78 | $3,123.67 | 0.60 | $428.39 | | | |
| 19-Sep-1986 | BS | LEHEM STL CORP | $8.13 | 2164 | $17,581.79 | $9.75 | 01-Apr-1987 | $9.88 | $21,368.83 | $3,788.85 | 0.00 | $0.00 | | | |
| 01-Apr-1987 | nav | AR INTL CORP NEW | $68.75 | 311 | $21,368.63 | $82.50 | 11-May-1987 | $82.50 | $25,642.38 | $4,273.73 | 0.00 | $0.00 | | | |
| 11-May-1988 | BA | BOEING CO COM | $10.03 | 2557 | $25,642.38 | $12.03 | 31-May-1988 | $12.22 | $31,253.85 | $5,611.48 | 0.32 | $823.97 | | | |
| 31-May-1988 | pa.2 | IMERICA CORP CO | $24.38 | 1282 | $31,253.85 | $28.25 | 28-Aug-1988 | $30.13 | $38,625.55 | $7,372.70 | 0.40 | $512.88 | | | |
| 26-Aug-1988 | UTX | ECHNOLOGIES CO | $8.84 | 4368 | $38,626.55 | $10.81 | 19-Jan-1989 | $10.69 | $46,679.43 | $8,052.88 | 0.10 | $436.77 | | | |
| 19-Jan-1989 | NAV | AR INTL CORP NEW | $52.50 | 889 | $46,679.43 | $63.00 | 03-Feb-1989 | $63.75 | $56,682.17 | $10,002.74 | 0.00 | $0.00 | | | |
| 03-Feb-1989 | GT | AR TIRE & RUBR C | $25.38 | 2234 | $56,682.17 | $30.45 | 03-Feb-1992 | $31.00 | $89,247.18 | $12,585.01 | 2.00 | $4,467.56 | | | |
| 03-Feb-1992 | wx | CBS CORP COM | $18.50 | 3743 | $69,247.18 | $22.20 | 13-Mar-1997 | $18.88 | $70,650.84 | $1,403.65 | 1.77 | $6,625.27 | | | |
| 13-Mar-1997 | t | AT&T CORP COM | $23.92 | 2954 | $70,650.84 | $28.70 | 15-Sep-1997 | $29.46 | $87,021.13 | $16,370.29 | 0.44 | $1,299.78 | | | |
| 15-Sep-1997 | EK | TMAN KODAK CO C | $60.00 | 1450 | $87,021.13 | $72.00 | 20-Apr-1998 | $73.44 | $106,510.24 | $19,489.11 | 0.88 | $1,276.31 | | | |
| 20-Apr-1998 | MO | MORRIS COS INC | $40.00 | 2663 | $106,510.24 | $48.00 | 06-Oct-1998 | $49.13 | $130,807.89 | $24,297.65 | 0.84 | $2,236.72 | | | |
| 06-Oct-1998 | C | ITIGROUP INC COM | $17.25 | 7583 | $130,807.89 | $20.70 | 18-Oct-1998 | $20.91 | $158,533.48 | $27,725.59 | 0.00 | $0.00 | | | |
| 16-Oct-1998 | BA | BOEING CO COM | $32.25 | 4916 | $158,533.48 | $38.70 | 02-Nov-1998 | $41.31 | $203,082.61 | $44,549.14 | 0.00 | $0.00 | | | |
| 02-Nov-1998 | C | ITIGROUP INC COM | $23.06 | 8808 | $203,082.81 | $27.68 | 07-Jan-1999 | $29.25 | $257,588.19 | $54,485.58 | 0.00 | $0.00 | | | |
| 07-Jan-1999 | ba | BOEING CO COM | $35.81 | 7192 | $257,568.19 | $42.98 | 03-May-1999 | $43.00 | $309,261.64 | $51,693.44 | 0.14 | $1,006.90 | | | |
| 03-May-1999 | mo | MORRIS COS INC | $38.25 | 8531 | $308,261.64 | $43.50 | | | | ($309,261.64) | 1.40 | $11,943.90 | $23.00 | $208,165.07 | ($101,096.56) |

Total Dividends → $29,808.08

| Purchase Date | Ticker | Company | Purchase Price | # of Shares | Basis | Target Price | Sell Date | Sell Price | % Gain/Loss on Price | Dividends on Selling Date | Total Basis On Selling Date | Price as of 3/31/2001 | Total Dividends as of 3/31/2001 | Current Holding Value |
|---|---|---|---|---|---|---|---|---|---|---|---|---|---|---|
| January 15, 1985 | xom | EXXON MOBIL CORP COM | $11.41 | 877 | $10,000.00 | $13.97 | January 1, 1986 | $13.97 | 22.47% | $758.16 | $13,002.74 | | | |
| January 7, 1986 | mrk | MERCK & CO INC COM | $3.93 | 3308 | $13,002.74 | $4.81 | March 31, 1986 | $4.84 | 23.14% | $82.70 | $16,094.91 | | | |
| March 31, 1986 | wx | CBS CORP COM | $27.44 | 587 | $16,094.91 | $33.81 | January 18, 1987 | $33.94 | 23.69% | $307.94 | $20,215.79 | | | |
| January 19, 1987 | mrk | MERCK & CO INC COM | $7.57 | 2871 | $20,215.79 | $9.27 | June 22, 1987 | $9.39 | 24.04% | $163.21 | $25,236.21 | | | |
| June 22, 1987 | MMM | MINNESOTA MNG&MFG CO COM | $35.75 | 706 | $25,238.21 | $43.79 | June 15, 1990 | $43.81 | 22.55% | $2,509.70 | $33,439.74 | | | |
| June 15, 1990 | PG | PROCTER & GAMBLE CO COM | $21.09 | 1585 | $33,439.74 | $25.84 | January 29, 1992 | $26.03 | 23.41% | $1,387.31 | $42,634.43 | | | |
| January 29, 1992 | 01951210 | HONEYWELL INTL INC COM | $12.13 | 3516 | $42,634.43 | $14.85 | May 12, 1992 | $14.88 | 22.68% | $219.77 | $52,523.86 | | | |
| May 12, 1992 | KO | COCA COLA CO COM | $21.44 | 2450 | $52,523.88 | $26.26 | November 21, 1994 | $26.58 | 23.91% | $2,064.20 | $67,144.79 | | | |
| November 21, 1994 | PG | PROCTER & GAMBLE CO COM | $31.63 | 2123 | $67,144.79 | $38.74 | September 25, 1995 | $38.81 | 22.73% | $1,167.74 | $83,572.71 | | | |
| September 25, 1985 | MCD | MCDONALDS CORP COM | $20.50 | 4077 | $83,572.71 | $25.11 | January 26, 1996 | $25.13 | 22.56% | $137.58 | $102,565.12 | | | |
| January 26, 1996 | GE | GENERAL ELEC CO COM | $12.58 | 8151 | $102,585.12 | $15.41 | October 4, 1998 | $15.58 | 23.84% | $1,874.70 | $128,892.43 | | | |
| October 4, 1996 | UTX | UNITED TECHNOLOGIES CORP COM | $30.47 | 4230 | $128,892.43 | $37.32 | February 12, 1997 | $38.25 | 25.54% | $581.67 | $162,391.24 | | | |
| February 12, 1997 | KO | COCA COLA CO COM | $60.25 | 2695 | $162,391.24 | $73.81 | March 18, 1998 | $74.81 | 24.17% | $1,913.68 | $203,555.08 | | | |
| March 18, 1998 | JPM | JP MORGAN CHASE & CO COM | $46.04 | 4421 | $203,555.06 | $56.40 | March 5, 1999 | $57.92 | 25.79% | $4,244.26 | $260,299.94 | | | |
| March 5, 1999 | AXP | AMERICAN EXPRESS CO COM | $39.54 | 6583 | $280,299.94 | $48.44 | August 23, 1999 | $48.79 | 23.39% | $987.44 | $322,179.46 | | | |
| August 23, 1999 | MMM | MINNESOTA MNG&MFG CO COM | $38.94 | 3256 | $322,179.46 | $121.20 | December 28, 2000 | $121.94 | 23.25% | $9,378.41 | $406,454.83 | | | |
| December 28, 2000 | JNJ | JOHNSON & JOHNSON COM | $104.75 | 3880 | $406,454.93 | $128.32 | | | | | | $87.47 | $1,241.68 | $340,648.10 |

| Purchase Date | Ticker | Company | Purchase Price | # of Shares | Basis | Target Price | Sell Date | Sell Price | % Gain/Loss on Price | Dividends on Selling Date | Total Basis On Selling Date | Price as of 3/31/2001 | Total Dividends as of 3/31/01 | Current Holding Value |
|---|---|---|---|---|---|---|---|---|---|---|---|---|---|---|
| January 15, 1985 | xom | EXXON MOBIL CORP COM | $11.41 | 438 | $5,000.00 | $13.97 | January 7, 1986 | $13.97 | 22.47% | $378.08 | $6,501.37 | | | |
| January 7, 1986 | mrk | MERCK & CO INC COM | $3.93 | 1654 | $6,501.37 | $4.81 | March 31, 1986 | $4.84 | 23.14% | $41.35 | $8,047.45 | | | |
| March 31, 1986 | wx | CBS CORP COM | $27.44 | 293 | $8,047.45 | $33.61 | January 19, 1987 | $33.94 | 23.69% | $153.98 | $10,107.90 | | | |
| January 19, 1987 | mrk | MERCK & CO INC COM | $7.57 | 1335 | $10,107.90 | $9.27 | June 22, 1987 | $9.39 | 24.04% | $81.61 | $12,619.10 | | | |
| June 22, 1987 | MMM | MINNESOTA MNG&MFG CO COM | $35.75 | 353 | $12,619.10 | $43.79 | June 15, 1990 | $43.81 | 22.55% | $1,254.85 | $16,719.87 | | | |
| June 15, 1990 | PG 0195121 | PROCTER&GAMBLE CO COM | $21.09 | 793 | $16,719.87 | $25.84 | January 29, 1992 | $26.03 | 23.41% | $683.66 | $21,317.22 | | | |
| January 29, 1992 | 0 | HONEYWELL INTL INC COM | $12.13 | 1758 | $21,317.22 | $14.85 | May 12, 1992 | $14.88 | 22.68% | $109.88 | $26,261.93 | | | |
| May 12, 1992 | KO | COCA COLA CO COM | $21.44 | 1225 | $26,261.93 | $26.26 | November 21, 1994 | $26.56 | 23.91% | $1,032.10 | $33,572.40 | | | |
| November 21, 1994 | PG | PROCTER & GAMBLE CO COM | $31.63 | 1062 | $33,572.40 | $38.74 | September 25, 1995 | $38.81 | 22.73% | $583.87 | $41,786.35 | | | |
| September 25, 1995 | MCD | MCDONALDS CORP COM | $20.50 | 2038 | $41,786.35 | $25.11 | January 26, 1996 | $25.13 | 22.56% | $68.79 | $51,282.56 | | | |
| January 26, 1996 | GE | GENERAL ELEC CO COM | $12.58 | 4075 | $51,282.56 | $15.41 | October 4, 1996 | $15.58 | 23.84% | $937.35 | $64,446.21 | | | |
| October 4, 1996 | UTX | UNITED TECHNOLOGIES CORP COM | $30.47 | 2115 | $64,446.21 | $37.32 | February 12, 1997 | $38.25 | 25.54% | $290.83 | $81,195.62 | | | |
| February 12, 1997 | KO | COCA COLA CO COM | $60.25 | 1348 | $81,195.62 | $73.81 | March 18, 1998 | $74.81 | 24.17% | $956.83 | $101,777.53 | | | |
| March 18, 1998 | JPM | J P MORGAN CHASE&CO COM | $46.04 | 2211 | $101,777.53 | $56.40 | March 5, 1999 | $57.92 | 25.79% | $2,122.13 | $130,149.97 | | | |
| March 5, 1999 | AXP | AMERICAN EXPRESS CO COM | $39.54 | 3291 | $130,149.97 | $48.44 | August 23, 1999 | $48.79 | 23.39% | $493.72 | $161,089.73 | | | |
| August 23, 1999 | MMM | MINNESOTA MNG&MFG CO COM | $98.94 | 1628 | $161,089.73 | $121.20 | December 28, 2000 | $121.94 | 23.25% | $4,689.21 | $203,227.47 | | | |
| December 28, 2000 | JNJ | JOHNSON & JOHNSON COM | $104.75 | 1940 | $203,227.47 | $128.32 | | | | | | $87.47 | $620.84 | $170,323.05 |
| January 15, 1985 | t | AT&T CORP COM | $13.67 | 366 | $5,000.00 | $16.40 | January 7, 1986 | $16.83 | 23.17% | $292.68 | $6,451.22 | | | |
| January 7, 1986 | BS | BETHLEHEM STL CORP COM | $15.63 | 413 | $6,451.22 | $18.75 | March 31, 1986 | $19.63 | 25.60% | $- | $8,102.73 | | | |
| March 31, 1986 | UK | UNION CARBIDE CORP COM | $22.00 | 368 | $8,102.73 | $26.40 | January 19, 1987 | $26.00 | 18.18% | $414.34 | $9,990.30 | | | |
| January 19, 1987 | bs | BETHLEHEM STL CORP COM | $7.50 | 1332 | $9,990.30 | $9.00 | June 22, 1987 | $15.13 | 101.67% | $- | $20,147.10 | | | |
| June 22, 1987 | BA | BOEING CO COM | $10.78 | 1869 | $20,147.10 | $12.93 | June 15, 1990 | $30.06 | 178.93% | $2,082.21 | $58,278.60 | | | |
| June 15, 1990 | gt | GOODYEAR TIRE&RUBR CO COM | $17.31 | 3366 | $58,278.60 | $20.78 | January 29, 1992 | $28.88 | 66.79% | $2,188.08 | $99,389.21 | | | |
| January 29, 1992 | wx | CBS CORP COM | $18.38 | 5409 | $99,389.21 | $22.05 | May 12, 1992 | $17.88 | -2.72% | $1,947.22 | $98,631.96 | | | |
| May 12, 1992 | ek | EASTMAN KODAK CO COM | $40.13 | 2458 | $98,631.96 | $48.15 | November 21, 1994 | $47.25 | 17.76% | $40,359.09 | $156,505.14 | | | |
| November 21, 1994 | GM | GENERAL MTRS CORP COM | $37.25 | 4201 | $156,505.14 | $44.70 | September 25, 1995 | $47.00 | 26.17% | $3,361.18 | $200,830.76 | | | |
| September 25, 1995 | S | SEARS ROEBUCK & CO COM | $36.25 | 5540 | $200,830.76 | $43.50 | January 26, 1996 | $39.88 | 10.00% | $1,274.24 | $222,188.07 | | | |
| January 26, 1996 | z | VENATOR GROUP INC COM | $11.25 | 19750 | $222,188.07 | $13.50 | October 4, 1996 | $21.38 | 90.00% | $- | $422,157.33 | | | |
| October 4, 1996 | BS | BETHLEHEM STL CORP COM | $8.63 | 48946 | $422,157.33 | $10.35 | February 12, 1997 | $7.88 | -8.70% | $- | $385,448.00 | | | |
| February 12, 1997 | T | AT&T CORP COM | $26.42 | 14591 | $385,448.00 | $31.70 | March 18, 1998 | $43.46 | 64.51% | $12,840.16 | $646,944.55 | | | |
| March 18, 1998 | ek | EASTMAN KODAK CO COM | $62.06 | 10424 | $646,944.55 | $74.48 | March 5, 1999 | $65.13 | 4.93% | $18,346.38 | $697,214.68 | | | |
| March 5, 1999 | ba | BOEING CO COM | $35.56 | 19605 | $697,214.68 | $42.68 | August 23, 1999 | $45.94 | 29.17% | $5,489.49 | $906,109.51 | | | |
| August 23, 1999 | MO | PHILIP MORRIS COS INC COM | $37.56 | 24123 | $906,109.51 | $45.08 | December 28, 2000 | $44.63 | 18.80% | $71,885.69 | $1,148,361.88 | | | |
| December 28, 2000 | t | AT&T CORP COM | $16.94 | 67800 | $1,148,361.88 | $20.33 | | | | | | $21.30 | $2,542.50 | $1,446,681.72 |

FIGURE 8B

| Purchase Date | Ticker | Company | Purchase Price | # of Shares | Basis | Target Price | Sell Date | Sell Price | % Gain/Loss on Price | Dividends on Selling Date | Total Basis On Selling Date | Price as of 3/31/2001 | Total Dividends as of 3/31/01 | Current Holding Value |
|---|---|---|---|---|---|---|---|---|---|---|---|---|---|---|
| January 15, 1985 | t | AT&T CORP COM | $13.67 | 366 | $5,000.00 | $16.40 | December 17, 1985 | $16.42 | 20.12% | $219.51 | $6,225.61 | | | |
| December 17, 1985 | tx | TEXACO INC COM | $13.81 | 451 | $6,225.61 | $16.58 | April 24, 1986 | $16.63 | 20.36% | $169.02 | $7,662.29 | | | |
| April 24, 1986 | 90399Y93 | USX CORP COM | $20.25 | 378 | $7,662.29 | $24.30 | September 19, 1986 | $24.63 | 21.60% | $227.03 | $9,544.75 | | | |
| September 19, 1986 | BS | BETHLEHEM STL CORP COM | $8.13 | 1175 | $9,544.75 | $9.75 | April 1, 1987 | $9.88 | 21.54% | $- | $11,600.55 | | | |
| April 1, 1987 | nav | NAVISTAR INTL CORP NEW COM | $68.75 | 169 | $11,600.55 | $82.50 | May 11, 1987 | $82.50 | 20.00% | $- | $13,920.66 | | | |
| May 11, 1987 | BA | BOEING CO COM | $10.03 | 1388 | $13,920.66 | $12.03 | May 31, 1988 | $12.22 | 21.88% | $447.31 | $17,414.32 | | | |
| May 31, 1988 | pa2 | PRIMERICA CORP COM | $24.38 | 714 | $17,414.32 | $29.25 | August 26, 1988 | $30.13 | 23.59% | $285.77 | $21,808.08 | | | |
| August 26, 1988 | UTX | UNITED TECHNOLOGIES CORP COM | $8.84 | 2466 | $21,808.08 | $10.61 | January 19, 1989 | $10.69 | 20.85% | $246.59 | $26,601.24 | | | |
| January 19, 1989 | NAV | NAVISTAR INTL CORP NEW COM | $52.50 | 507 | $26,601.24 | $63.00 | February 3, 1989 | $63.75 | 21.43% | $- | $32,301.50 | | | |
| February 3, 1989 | GT | GOODYEAR TIRE&RUBR CO COM | $25.38 | 1273 | $32,301.50 | $30.45 | February 3, 1992 | $31.00 | 22.17% | $2,545.93 | $42,007.87 | | | |
| February 3, 1992 | wx | CBS CORP COM | $18.50 | 2271 | $42,007.87 | $22.20 | March 13, 1997 | $18.88 | 2.03% | $4,019.13 | $46,878.51 | | | |
| March 13, 1997 | t | AT&T CORP COM | $23.92 | 1960 | $46,878.51 | $28.70 | September 15, 1997 | $29.46 | 23.17% | $862.43 | $58,603.02 | | | |
| September 15, 1997 | EK | EASTMAN KODAK CO COM | $60.00 | 977 | $58,603.02 | $72.00 | April 20, 1998 | $73.44 | 22.40% | $859.51 | $72,587.17 | | | |
| April 20, 1998 | MO | PHILIP MORRIS COS INC COM | $40.00 | 1815 | $72,587.17 | $48.00 | October 6, 1998 | $49.13 | 22.81% | $1,524.33 | $90,670.44 | | | |
| October 6, 1998 | C | CITIGROUP INC COM | $17.25 | 5256 | $90,670.44 | $20.70 | October 16, 1998 | $20.91 | 21.20% | $- | $109,888.63 | | | |
| October 16, 1998 | BA | BOEING CO COM | $32.25 | 3407 | $109,888.63 | $38.70 | November 2, 1998 | $41.31 | 28.10% | $- | $140,768.19 | | | |
| November 2, 1998 | C | CITIGROUP INC COM | $23.06 | 6104 | $140,768.19 | $27.68 | January 7, 1999 | $29.25 | 26.83% | $- | $178,535.27 | | | |
| January 7, 1999 | ba | BOEING CO COM | $35.81 | 4985 | $178,535.27 | $42.98 | May 3, 1999 | $43.00 | 20.07% | $697.94 | $215,064.89 | | | |
| May 3, 1999 | mo | PHILIP MORRIS COS INC COM | $36.25 | 5933 | $215,064.89 | $43.50 | December 20, 2000 | $44.13 | 21.72% | $20,290.26 | $282,076.15 | | | |
| December 20, 2000 | t | AT&T CORP COM | $18.94 | 14895 | $282,076.15 | $22.73 | January 10, 2001 | $23.13 | 22.11% | $558.57 | $345,007.99 | | | |
| January 10, 2001 | HWP | HEWLETT PACKARD CO COM | $31.75 | 10866 | $345,007.99 | $38.10 | | | | | | $31.27 | $869.31 | $340,661.43 |
| January 15, 1985 | xom | EXXON MOBIL CORP COM | $11.41 | 438 | $5,000.00 | $13.97 | December 17, 1985 | $13.47 | 18.08% | $378.08 | $6,282.19 | | | |
| December 17, 1985 | GT | GOODYEAR TIRE&RUBR CO COM | $15.38 | 409 | $6,282.19 | $18.83 | April 24, 1986 | $15.69 | 2.03% | $81.72 | $6,491.60 | | | |
| April 24, 1986 | z | VENATOR GROUP INC COM | $19.88 | 327 | $6,491.60 | $24.35 | September 19, 1986 | $19.19 | -3.46% | $91.45 | $6,358.50 | | | |
| September 19, 1986 | IP | INTL PAPER CO COM | $17.38 | 366 | $6,358.50 | $21.28 | April 1, 1987 | $27.16 | 56.29% | $109.79 | $10,047.80 | | | |
| April 1, 1987 | XOM | EXXON MOBIL CORP COM | $22.13 | 454 | $10,047.80 | $27.10 | May 11, 1987 | $22.13 | 0.00% | $102.18 | $10,149.98 | | | |
| May 11, 1987 | MCD | MCDONALDS CORP COM | $6.73 | 1508 | $10,149.98 | $8.24 | May 31, 1988 | $5.50 | -18.27% | $120.67 | $8,416.63 | | | |
| May 31, 1988 | TX | TEXACO INC COM | $25.13 | 335 | $8,416.63 | $30.78 | August 26, 1988 | $22.75 | -9.45% | $125.62 | $7,746.65 | | | |
| August 26, 1988 | BA | BOEING CO COM | $13.11 | 591 | $7,746.65 | $16.06 | January 19, 1989 | $13.61 | 3.81% | $52.52 | $8,094.59 | | | |
| January 19, 1989 | TX | TEXACO INC COM | $27.38 | 296 | $8,094.59 | $33.53 | February 3, 1989 | $24.75 | -9.59% | $110.88 | $7,429.28 | | | |
| February 3, 1989 | MRK | MERCK & CO INC COM | $10.88 | 683 | $7,429.28 | $13.32 | February 3, 1992 | $25.73 | 136.59% | $696.82 | $18,273.76 | | | |
| February 3, 1992 | GT | GOODYEAR TIRE&RUBR CO COM | $31.00 | 589 | $18,273.76 | $37.98 | March 13, 1997 | $53.13 | 71.37% | $2,275.38 | $33,591.30 | | | |
| March 13, 1997 | s | SEARS ROEBUCK&CO COM | $55.63 | 604 | $33,591.30 | $68.14 | September 15, 1997 | $56.69 | 1.91% | $277.79 | $34,510.72 | | | |
| September 15, 1997 | GM | GENERAL MTRS CORP COM | $68.00 | 508 | $34,510.72 | $83.30 | April 20, 1998 | $69.75 | 2.57% | $2,279.43 | $37,678.30 | | | |
| April 20, 1998 | DIS | DISNEY WALT CO COM DISNEY | $38.46 | 980 | $37,678.30 | $47.11 | October 6, 1998 | $25.38 | -34.02% | $51.44 | $24,911.77 | | | |
| October 6, 1998 | XOM | EXXON MOBIL CORP COM | $75.75 | 329 | $24,911.77 | $92.29 | October 16, 1998 | $76.31 | 0.74% | $- | $25,096.75 | | | |
| October 16, 1998 | JNJ | JOHNSON&JOHNSON COM | $83.13 | 302 | $25,096.75 | $101.83 | November 2, 1998 | $81.56 | -1.88% | $- | $24,625.01 | | | |
| November 2, 1998 | mrk | MERCK & CO INC COM | $69.25 | 356 | $24,625.01 | $84.83 | January 7, 1999 | $76.16 | 9.97% | $96.01 | $27,176.85 | | | |
| January 7, 1999 | JPM | J P MORGAN CHASE&CO COM | $51.38 | 529 | $27,176.85 | $62.93 | May 3, 1999 | $55.17 | 7.38% | $144.59 | $29,327.20 | | | |
| May 3, 1999 | GM | GENERAL MTRS CORP COM | $93.75 | 313 | $29,327.20 | $114.84 | December 20, 2000 | $50.00 | -46.67% | $5,577.02 | $21,218.19 | | | |
| December 20, 2000 | mo | PHILIP MORRIS COS INC COM | $44.13 | 481 | $21,218.19 | $54.05 | January 10, 2001 | $44.13 | 0.00% | $- | $21,218.19 | | | |
| January 10, 2001 | mmm | MINNESOTA MNG&MFG CO COM | $112.31 | 189 | $21,218.19 | $137.58 | | | | | | $103.90 | $113.35 | $19,742.24 |

$1,717,815.53

| June | | as of date: | 19.00 |
|---|---|---|---|
| Company Name | Price as of the 19th | 52 week high price as of the 19th | % change |
| PG PROCTER & GAMBLE CO COM | $93.85 | $ 94.18 | -0.35% |
| MMM 3M CO COM | $128.49 | $ 130.60 | -1.62% |
| MCD MCDONALDS CORP COM | $30.12 | $ 31.00 | -2.84% |
| KO COCA COLA CO COM | $55.94 | $ 57.91 | -3.40% |
| MO PHILIP MORRIS COS INC COM | $54.95 | $ 57.79 | -4.91% |
| IP INTL PAPER CO COM | $43.46 | $ 46.20 | -5.93% |
| wmt WAL MART STORES INC COM | $58.04 | $ 63.94 | -9.23% |
| hon HONEYWELL INTL INC COM | $37.10 | $ 40.95 | -9.40% |
| UTX UNITED TECHNOLOGIES CORP COM | $70.47 | $ 78.00 | -9.65% |
| DD DU PONT E I DE NEMOURS & CO COM | $44.52 | $ 49.80 | -10.60% |
| XOM EXXON MOBIL CORP COM | $39.71 | $ 44.58 | -10.92% |
| JNJ JOHNSON & JOHNSON COM | $56.57 | $ 65.89 | -14.14% |
| AXP AMERICAN EXPRESS CO COM | $38.40 | $ 44.91 | -14.50% |
| GM GENERAL MTRS CORP COM | $56.67 | $ 68.17 | -16.87% |
| CAT CATERPILLAR INC DEL COM | $48.85 | $ 59.99 | -18.57% |
| C CITIGROUP INC COM | $42.55 | $ 53.75 | -20.84% |
| AA ALCOA INC COM | $31.91 | $ 42.00 | -24.02% |
| JPM J P MORGAN CHASE & CO COM | $34.84 | $ 47.23 | -26.23% |
| MSFT MICROSOFT CORP COM | $55.22 | $ 76.15 | -27.49% |
| HD HOME DEPOT INC COM | $38.09 | $ 52.60 | -27.59% |
| MRK MERCK & CO INC COM | $53.13 | $ 75.85 | -29.95% |
| DIS DISNEY WALT CO COM DISNEY | $20.94 | $ 30.29 | -30.87% |
| BA BOEING CO COM | $43.75 | $ 64.88 | -32.57% |
| SBC SBC COMMUNICATIONS INC COM | $31.60 | $ 47.50 | -33.47% |
| EK EASTMAN KODAK CO COM | $30.78 | $ 49.47 | -37.78% |
| HWP HEWLETT PACKARD CO COM | $17.34 | $ 29.16 | -40.53% |
| IBM INTERNATIONAL BUSINESS MACHS COM | $74.46 | $ 126.39 | -41.09% |
| GE GENERAL ELEC CO COM | $30.84 | $ 52.61 | -41.38% |
| INTC INTEL CORP COM | $20.55 | $ 36.78 | -44.13% |
| T AT&T CORP COM | $10.04 | $ 23.00 | -56.35% |
| | | | -0.35% |
| | | | -56.35% |

Figure 9

SYSTEM AND METHOD FOR SELECTING SECURITIES FOR INVESTMENT

RELATED APPLICATIONS

This application is a continuation of U.S. patent application Ser. No. 10/212,014 filed Aug. 2, 2002 and claims the benefit of U.S. Provisional Application No. 60/309,820 entitled "System and Method for Selecting Securities for Investment" filed on Aug. 3, 2001, the contents of which are incorporated herein in their entirety.

BACKGROUND

Individual investors are faced with numerous investment decisions and financial products. It is important for these investors to establish personal financial goals. For many, these goals are long-term, such as supplementing government retirement programs or paying for a child's education. Others may have more immediate goals such as making a down payment on a home or car. Regardless of the goals, many investors choose to invest in mutual funds in order to achieve these goals. Former SEC chairman Aurthur Levitt is quoted as saying "Mutual funds are the primary investment vehicle of choice for most Americans."

The first mutual fund was offered in the United States during the 1920's. The idea was to provide to investors a company that invests in a diversified portfolio of securities. Individual investors who buy shares of a mutual fund are its owners or shareholders. The money invested by these individuals is used to purchase securities such as stocks or bonds.

The Investment Company Act of 1940 provided the legal framework that allowed for creativity in the development of the industry and guarded against the possibility of abuse. During the five years after the enactment of the Investment Company Act, total assets of all mutual funds tripled. In recent times this growth rate has been even more dramatic. According to the Investment Company Institute Annual Report for 1999, 49.2 million US households or an astonishing 48.2 percent own equities either in mutual funds or individually. The growth in popularity of mutual funds in the United States continues. According to the 2000 Investment Company Institute Annual Report, U.S. based mutual funds account for 6.969 trillion dollars under management. Equity Funds constitute 3.96 trillion dollars of that amount.

Mutual funds can make money in two basic ways: a component security can pay a dividend, or a component security can appreciate in value. Mutual funds lose money when component securities depreciate in value.

Many mutual funds invest primarily in stock. A share of stock represents a unit of ownership of the company which issues that stock. If the company is successful, the stock may increase in value, or the company may pay a dividend to its shareholders, which may be a mutual fund. Investors who buy shares of such a mutual fund become, in essence, part owners of each of the securities in the portfolio. As the value of the securities in the portfolio increase, the value of the investors' investments in the mutual fund increases.

Investors choose to invest in mutual funds over individual stocks for many reasons. These reasons typically include professional management, diversification, liquidity, and convenience. Mutual funds are usually managed by an individual or a team who chooses investments to match the fund's objectives. These managers are often experienced investors who can devote the time required to continually monitor the investments of the fund. The performances of the numerous mutual funds available to investors vary widely. By diversifying investments, the mutual fund can reduce the adverse impact of a single investment. Therefore, mutual funds typically hold a broad variety of securities. Moreover, since the money used to buy the securities is the aggregate investment of all the find investors, the mutual fund can purchase more securities and offer a more diversified portfolio than most investors could achieve individually. Since mutual fund shares can be sold on any business day, they are liquid investments.

There currently exists a mind boggling over 11,767 mutual funds from which investors may choose. Of these many funds, only 18 performed better than the Dow Jones Industrial Average (DJIA) over a fifteen year period between, Dec. 31, 1985 and Dec. 31, 2000. The DJIA is an index of 30 blue chip stocks or securities. The DJIA is a price weighted index. Editors of Dow Jones and Company decide on the admission and removal of a particular component and on the weighting mechanism to determine the value of the DJIA. The DJIA is often used as an indicator of the overall performance of the stock market. Other common stock indices include the S&P 500 and the NASDAQ Composite Index.

Index funds over time have become a popular investment tool. Index funds are an efficient method of obtaining broad diversity allowing investors to passively embrace the performance of a particular market index. Stock index funds seek to match the returns of a specified stock index, such as the S&P 500, an index of 500 companies in the U.S. An index fund simply seeks to match "the market" by buying representative amounts of each stock in the index, rather than paying a manager to select individual stocks, sectors, or investment strategies. In many cases, index funds outperform professionally managed mutual funds benchmarked to particular indices.

Another popular approach of investing used by many is known as dollar cost averaging. This refers to the practice of investing the same amount of money in the same investment at regular intervals, for example every month, regardless of current market conditions. Because this method is predicated on investing the same amount each time, the investor automatically buys more shares when the price is low, and fewer when the price is high. The benefit of this approach is that, over time, investors may reduce the risk of having bought shares when their price was highest. Proponents of this method warn against "timing the market." The volatility of stock prices and the many factors that can affect stock prices, make it difficult to predict when a stock price has reached, or will reach, a low point or high point.

Rapidly changing markets and stock price volatility increases the degree of difficulty individual investors face when selecting individual stocks for either purchase or sale in an attempt to manage their personal stock portfolios. Investors choosing to invest in mutual funds are faced with an abundance of funds, the vast majority of which do not approach the aggregate performance of the securities which make up the components of a representative benchmark index, despite being professionally managed.

SUMMARY

Certain embodiments of the present invention provide an automated system and method for making investment decisions and managing an investment portfolio. Certain embodiments of the present invention identify securities based on index membership, and/or fundamental and/or technical criteria related to specific stocks using information obtained in real time. Certain embodiments of the invention provide returns to an investor over time that are superior to most other investment alternatives such as mutual funds, index funds, and purchasing and holding individual stocks.

Certain embodiments of the present invention operate in a manner distinct from other investment management systems. The system and method involve a strict buy/sell discipline that is applied to individual securities of a stock index. Examples of such an index are the DJIA, S&P 500, and the NASDAQ Composite Index. Other indexes include, but are not limited to, the following: Wilshire Unweighted, Wilshire Small Company Value, Wilshire Utility, Wilshire Finance, Russell 1000 Growth, Russell 1000 Value, S&P 500 Composite, Russell Midcap Index, Wilshire Large Company Growth, Russell Top 200 Index, Russell 1000, MSCI North America Equity Index, S&P Industrials, MSCI Europe Equity Index, Russell 3000, S&P 500/Barra Growth, Russell 2000 Value, Wilshire 5000 Total Market Index, NASDAQ Composite, Wilshire Small Cap 1750, MSCI EASEA Index (EAFE ex Japan), Belgium BEL 20 Equity Index, MSCI World Equity Index, Russell 2500, Spain Madrid Equity Index, NAREIT REIT: Equity, Hong Kong Hang Seng Equity Index, MSCI World Equity ex USA, Italy Milan Equity Index, Germany FAZ Aktien Equity Index, Russell 2000, Russell 2500 Growth, S&P Midcap 400, S&P Small Cap 600, S&P Super Comp 1500. The automated system and method of certain embodiments of the present invention yield greater returns over time than virtually any currently available mutual fund or index fund.

In operation, the investor initiates an account with the system provider or administrator. This is typically accompanied by a deposit of funds with the system provider. Either the user or the system provider may select a specific index to apply the system and method to, for example the DJIA. The DJIA is comprised of thirty different stocks (or securities) at any given time. Current information regarding the value of each of the securities is continuously fed to the system over a high speed data connection. This information may be obtained from financial sources available on the Internet and other sources of financial information such as Factset, Reuters, Bridge, Bloomberg, Compustat, ADP and others. Certain embodiments of the present invention operate by selecting for purchase the individual security within the selected index that is trading in the open market at the greatest percentage below its 52 week high value, as compared to the other securities within the selected index. Service offerings provided by Factset and others allow a user to input a date, including the present date, and determine which security in a given index is trading at a value closest to its 52 week high price and furthest percentage difference from its 52 week high price. The system purchases shares of the selected security with the funds deposited by the investor. The system holds the security until it appreciates by a predetermined value, for example 20%, from its cost basis or purchase price. Once the security has appreciated by the predetermined amount, the security is automatically sold by the system. The system provider may make a determination to limit the amount of shares of a selected security to purchase or sell at any one time due to market factors. For example, the system provider may choose to limit the amount of a selected security either being purchased or sold to ten percent of the average daily trading volume over the previous thirty days.

The proceeds from the sale of the security are reinvested according to the system and method as described. The system, which continuously receives real time information related to the market price of the securities within the selected index, selects the security within the selected index which is trading at the greatest percentage below its 52 week high value. The system should not select the security that was most recently sold, in which case the security trading the second greatest percentage below its 52 week high value is selected. This security is purchased with the funds acquired from the previous sale. The security is then held until it appreciates by the predetermined amount, at which time it is sold. The investor may choose to liquidate his holdings at any given time, although in order to achieve the performance goals of certain embodiments of the present invention, it is preferable to continuously reinvest proceeds for a prolonged period of time.

BRIEF DESCRIPTION OF THE DRAWINGS

FIG. 6 is a table showing hypothetical finds invested according to an alternate embodiment of the present invention.

FIG. 8 is a table showing hypothetical finds invested according to an alternate embodiment of the present invention.

FIG. 9. is a screen shot showing identification parameters within an index.

DETAILED DESCRIPTION

Certain embodiments of the present invention are directed to an automated system and method for purchasing securities and managing an investment portfolio. Certain embodiments of the invention provide a system and method that is based on a strict buy/sell discipline of securities within a specified stock index. Based on historical data, the system and method of certain embodiments of the present invention outperformed virtually all existing mutual funds or index funds during the period between Dec. 31, 1984 and Dec. 31, 2000.

Certain embodiments of the present invention involve buying and selling securities within a specific index. The description of certain embodiments of the present invention will specify the DJIA as the selected index but it should be understood that any index, such as the S&P 500 and the NASDAQ Composite Index or others, can be used. It should be understood that certain embodiments of the present invention are equipped with real time stock price information. This information may be provided to the system from the Internet or another communication source, as well as other data.

Certain embodiments of the present invention involve the buying and selling of stocks. Stocks are sold in individual shares through an open market such as the New York Stock Exchange. In recent years, the buying and selling of stock shares using the Internet has become very popular. Each stock price is given a symbol when it is first offered on the stock exchange. Investors interested in purchasing a particular stock can use the symbol to inquire as to the price of the stock, using the Internet or other methods. The stock price is reported in fractions of dollars. Along with the price information, the investor may receive information regarding the 52 week high price of the stock, i.e. the highest price a share of that stock has reached in the preceding 52 weeks. Investors may receive a myriad of other financial information related to the stock price or the company if desired.

Certain embodiments of the present invention rely on a strict buy/sell discipline. After the investor initiates an account with the system provider, an index, such as the DJIA, is selected. Certain embodiments of the present invention have access to real time stock prices for all of the 30 securities that are components of the DJIA. The system also has access to the 52 week high prices of all of these securities. This information may be provided by the Internet or by other data inputs, including, but not limited to, information provided by Factset. The system calculates the percentage difference between the current stock price and the 52 week high price for each of the securities and selects the security which is trading at the greatest percentage below its 52 week high price. The system then purchases shares of the security at the current market price with the funds available in the investor's account. The number of shares purchased is typically dependent upon the amount of funds available in the investor's account, however alternate arrangements could be made between the system provider and the investor.

The system calculates a target sell price for the selected security. This target sell price is a pre-selected percentage increase over the purchase price of the shares. For example, if the pre-selected percentage value increase was 20%, the system would set a target sell price of 20% above the purchase price. The system holds the shares until the price of the security reaches the target sell price. It should be understood that, due to the volatility of the stock market, the length of time the system will hold the shares is unpredictable. The selected security may reach the target sell price very quickly or it may take a prolonged period of time. Other events that may trigger a sale prior to reaching the target sell price is if the selected security is removed from the selected index. In such a case, the system will sell the shares of the security on the most beneficial terms available and reinvest the proceeds from the sale, and any dividends that may have been issued during the holding period, according to certain embodiments of the present invention. The system may also account for merger and divestiture related transactions of securities held in a particular portfolio. For example, if a held security spins out into the open market or sells a division of its business generating a distribution to current shareholders, resulting proceeds which are not a part of the selected index may be sold on most beneficial terms and reinvested according to certain embodiments of the present invention.

While the system holds the shares of the selected security, the issuing company may elect to pay a dividend to its shareholders. These dividends can be held by the system in a money market type account or can be paid directly to the investor. Any dividends received during the holding period for an individual security may be held in cash until the constructive sale occurs. Dividends may then be reinvested into the system.

The system monitors the market price of the selected security at all times. Once the target sell price is reached, the system immediately begins to sell the shares of the selected security and continues to do so as long as the market price remains at or above the target sell price. The proceeds of this sale are immediately reinvested according to the method described above. That is, the system selects a second security within the selected index which is the greatest percentage removed from its 52 week high for purchase. It should be understood that any dividends received by the investor from the purchase of the first selected security, as well as any additional funds deposited by the investor, may be invested at the time the second selected security is purchased according to the present system and method if so desired.

Figure 1:
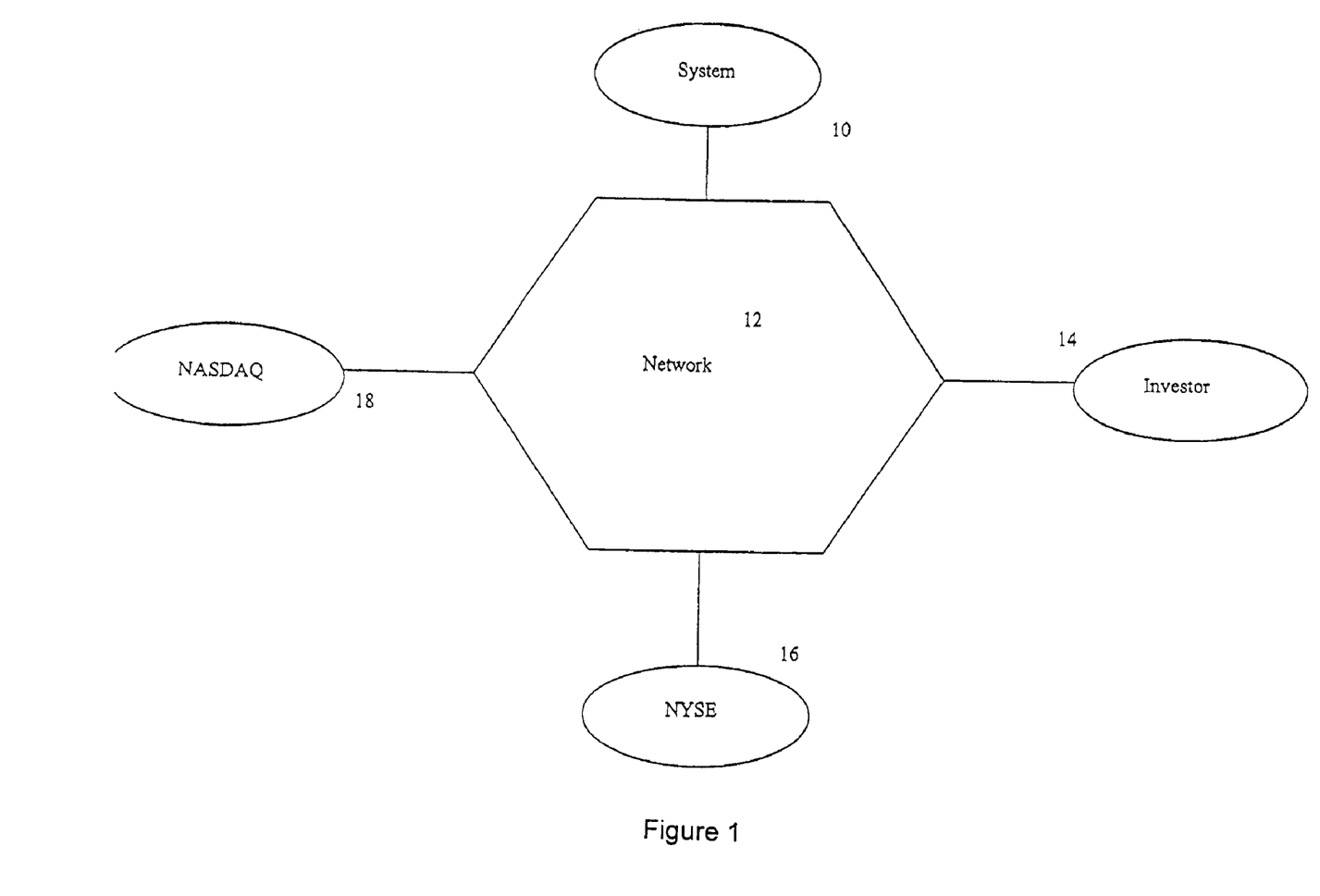
FIG. 1 is a functional block diagram showing a platform of one embodiment of the present invention in relationship to other entities in a data network.

FIG. 1 shows a functional block diagram of one version of systems and methods according to certain embodiments of the present invention. System 10 may comprise an interactive platform such as a web site running on conventional platforms and containing processing, memory, input/output, and other conventional computer components. The memory contains a database or databases of information relating to securities, stock indices, and other relevant or desired information for use and presentation via an input/output functionality through or with the aid of a processor functionality. System 10 can interact through Internet or any other data or telecommunications network 12 with investors 14, New York Stock Exchange (NYSE) 16, NASDAQ 18, and any other entity as desired. Whether switched or unswitched, communications media may include fiber, wireline, wireless, infrared or otherwise, and may occur using any desired platform or software. Investors 14 may access the platform to access systems and methods according to certain embodiments of the present invention.

Investors 14 access system 10 in order to interact or engage in certain activities. These activities include: initiate an account, check current market prices, check account value, check account balance, track investments, research an index.

Figure 2:
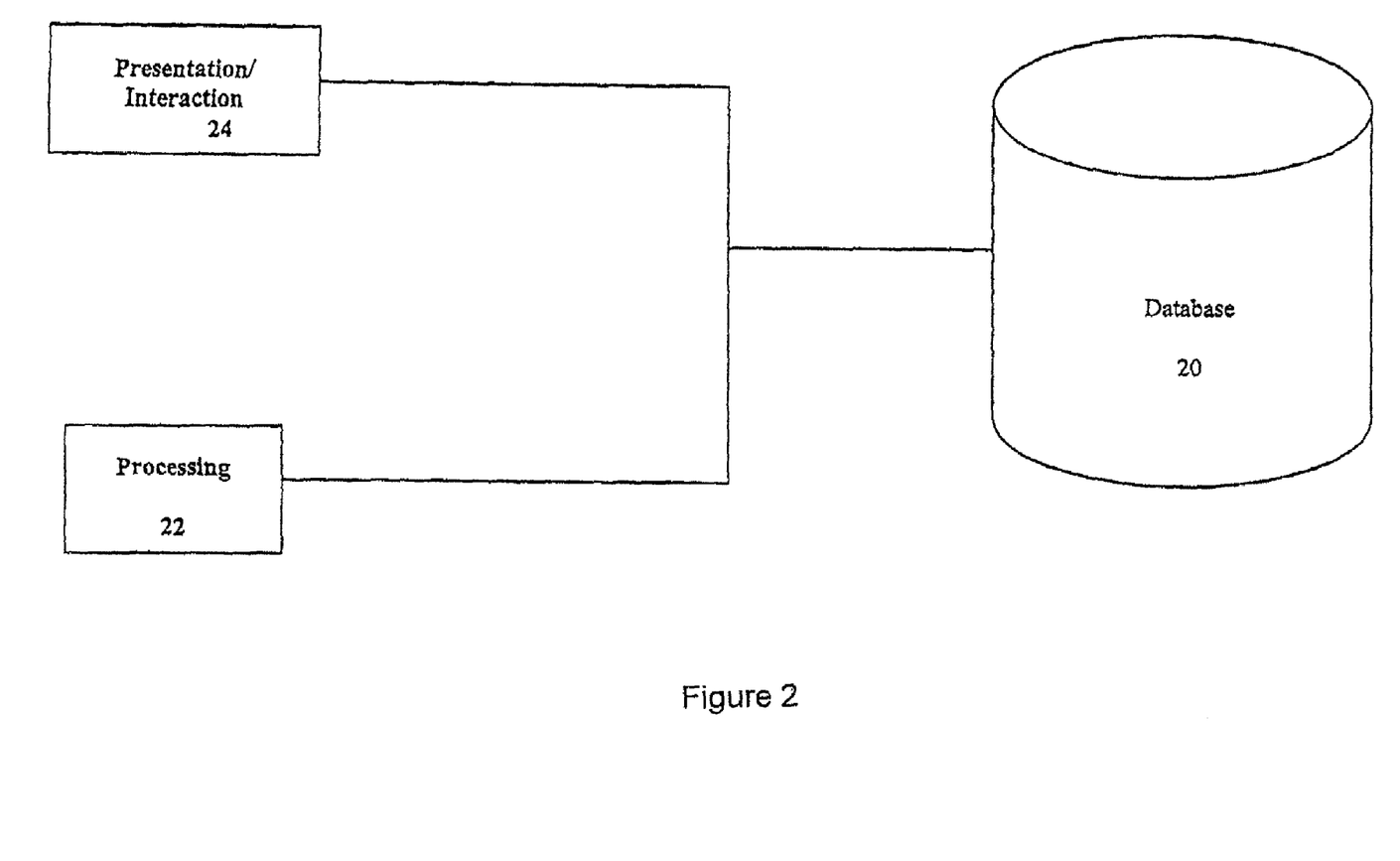
FIG. 2 is a functional block diagram showing a system and platform according to one embodiment of the present invention.

FIG. 2 shows a functional block diagram of components of the system 10 according to certain embodiments of the present invention. System 10 may comprise a database 20 which communicates with processing functionality to store, process and provide information to and receive information from presentation/interaction functionality 24.

Figure 3:
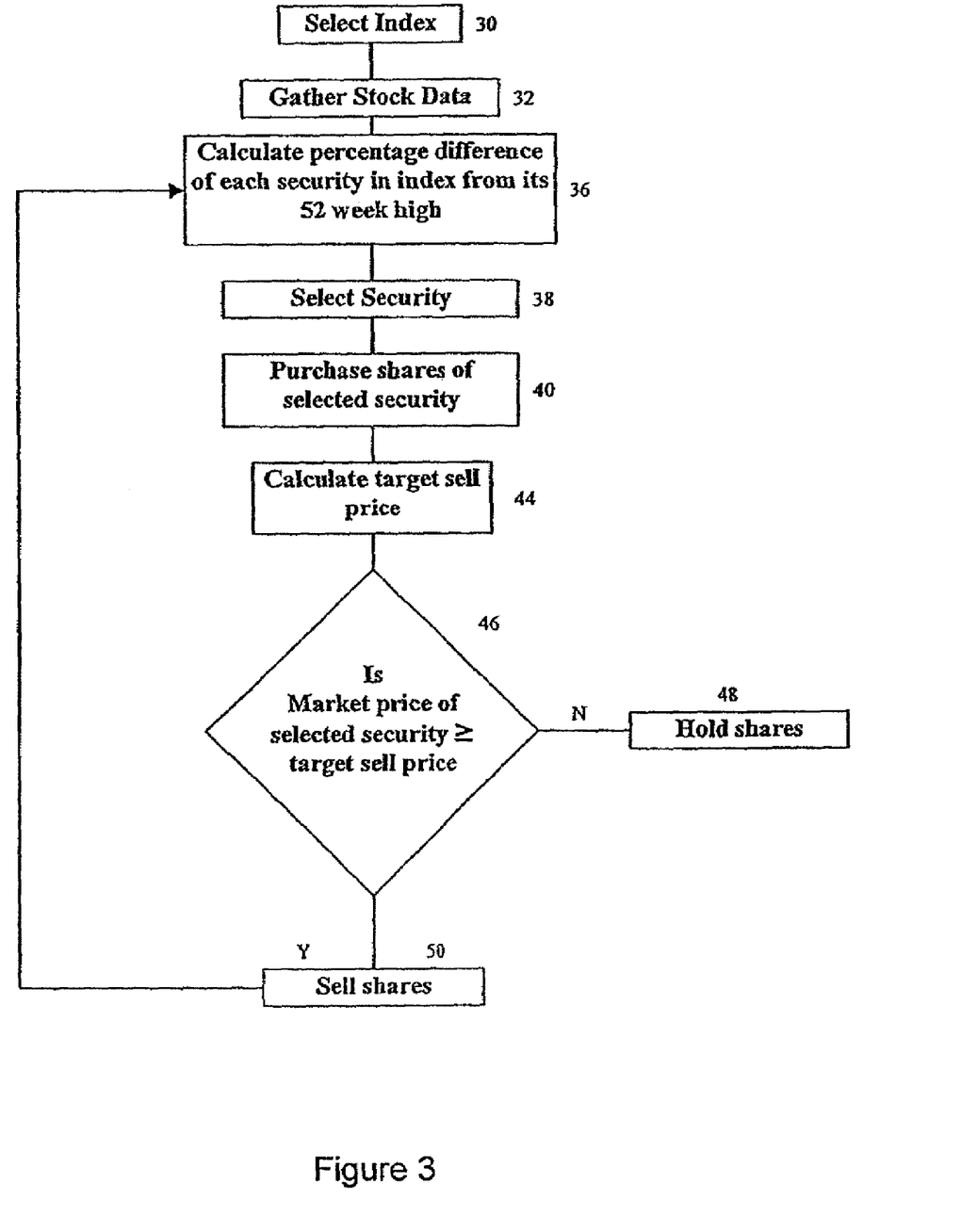
FIG. 3 shows a process flow according to one embodiment of the present invention.

FIG. 3 is a flow diagram of one process according to certain embodiments of the present invention in which an investor 14 has already initiated an account. Block 30 indicates that an index is selected. This can be done either by the investor, system provider, or by other automated methods. Once the index is selected, data on the securities included within the index is gathered by the system at block 32. The system is equipped to continually monitor information related to securities, such as stock prices, using data feeds such as the Internet or other data or telecommunications networks.

At block 36, the system makes a calculation for each security in the selected index. The system calculates the percentage difference of the current market price for each security from its 52 week high price. The system selects a first security at block 38. The system selects the security that is trading at the greatest percentage difference from its 52 week high. At block 40, the system purchases shares of the first selected security. The number of shares purchased is dependent on the market price at which the shares are bought and the amount of funds available in the investor's account. It should be understood that alternate arrangements for payment can be made such as a credit line for the investor.

The system calculates a target sell price at block 44. The target sell price is a pre-selected percentage increase over the purchase price, for example twenty percent. The system then continually monitors the price of the first selected security until it reaches the target sell price. Block 46 indicates that the system is continually comparing the current market price of the first selected security with the target sell price. The system holds the security as indicated in block 48 as long as the current market price is below the target sell price. When the current market price reaches or exceeds the target sell price, the system immediately sells the first selected security at block 50. The proceeds from the sale of the first selected security are reinvested according to the system and method as described at block 40 after the system makes the calculation at block 36 and selects a second selected security at block 38. It should be understood that the second selected security should not be the same security as the first selected security. In such a case, the system may select the security that is trading at a market price that is the second greatest percentage removed from its 52 week high price.

Figure 4:
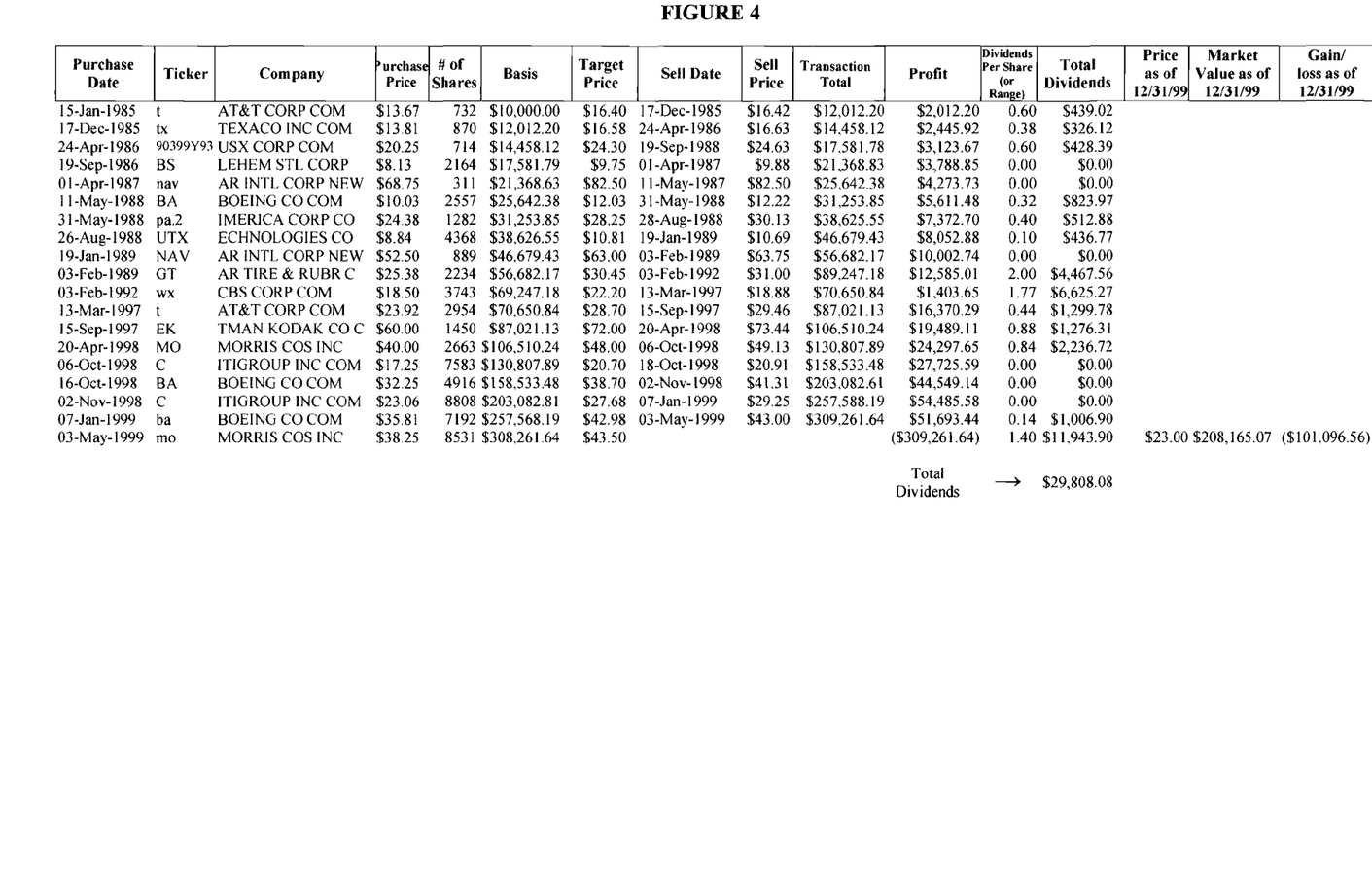
FIG. 4 is a table showing hypothetical funds invested according to one embodiment of the present invention.

The following example of the system and method of certain embodiments of the present invention is provided as shown in the table of FIG. 4. In the example, the investor has initiated the account and deposited a hypothetical sum of $10,000 with the system provider prior to Jan. 15, 1985. The example uses actual historical data, including stock prices. It should be understood that the dates are only provided to give a timeline and an accurate indication as to the performance of certain embodiments of the present present invention and is not intended to indicate conception or actual use of the present invention.

In the present example, the system selects the DJIA as the index and gathers the data for each of the thirty securities listed in the DJIA as of Jan. 15, 1985. This information includes market price per share at that time and the 52 week high price for each security. The system makes a calculation for each of the securities to determine the percentage difference from the market price at that time and the 52 week high price. The system compares the percentage difference for each of the thirty securities and selects AT&T Corporation as the first selected security because it is trading at the greatest percentage below its 52 week high as compared to the other twenty nine securities. On Jan. 15, 1985 the system hypothetically purchases 732 shares of AT&T Corporation at a price of $13.67 per share, the closing market price for AT&T on Jan. 15, 1995. The system purchases 732 shares because that is the maximum amount of shares that can be bought with $10,000.

The system calculates a target price of twenty percent more than the purchase price for the shares of AT&T Corporation. The present example is predicated on a strict buy/sell discipline that requires each held security to be sold at a price twenty percent greater than its purchase price. It should be understood that other percentage values may be used according to the present system and method. The target sell price for the first selected security is $16.40 per share. The system continually compares the market price of the first selected security with the target sell price. On Dec. 17, 1985, the market price of AT&T Corporation reaches the target sell price and the 732 shares are sold for $16.42 per share. The total proceeds from the sale are $12,012.20 which is a profit of $2012.20. While the data of FIG. 4 identifies the first closing price of each selected security exceeding the target sell price, it should be understood that certain embodiments of the present invention may operate in real time allowing for transactions at the target sell price rather than the closing price.

On Dec. 17, 1985, after the sale of the shares of AT&T Corporation, the system again calculates the percentage difference from the market price at that time and the 52 week high price for each of the thirty DJIA component securities. After comparing these percentages to determine which security is trading at the greatest percentage below its 52 week high, the system selects Texaco Inc. trading at $13.81 per share, at the close of market that day, as the second selected security and purchases 870 shares. It should be understood that certain embodiments of the present invention may operate in real time and make purchase decisions immediately after a sale rather than at the close of market. The system sets a target sell price of $16.58 per share, twenty percent above the purchase price. On Apr. 24, 1986 Texaco Inc. reaches the target price and the 870 shares are sold for $16.63 per share. The total proceeds from the sale are $14,458.12, a profit of $2,445.92.

The system continues to purchase and sell securities according to the above described methodology until May 3, 1999 at which time the current selected security is Phillip Morris. As shown by the table in FIG. 4, if the hypothetical sum of $10,000 had been invested on Jan. 15, 1985 according to the above described example, the account would have grown to $309,261.64, without reinvesting any dividends. This is an internal rate of return of over 25 percent, which outperforms the vast majority, if not all, currently available professionally managed mutual funds and index funds.

In another embodiment of the present invention, the system selects the security within the selected index which is trading closest to its 52 week high price. It is possible that a security is trading at its 52 week high price, in which case that security is selected. The system then purchases shares of the selected security. The number of shares purchased is dependent upon the funds available in the investors account, or the system may purchase a predetermined amount of the selected security for an investor who deposits funds with the system shortly thereafter.

After purchasing the selected security, the system determines a target sell price for the selected security. The target sell price is a pre-selected percentage increase over the purchase price of the shares of the selected security. For example, if the pre-selected percentage increase is 22.5%, the system sets a target sell price of 22.5% above the purchase price. The system holds the security until the price of the security reaches the target sell price. As stated before, due to market volatility, this may be a relatively short period of time, or may be a prolonged period of time. In the event the selected security is removed from the selected index, the selected security is sold at that time on most beneficial terms.

In the event dividends are paid while the investor is holding the selected security, the system may pay the dividends directly to the investor. Alternatively, the system may hold any such dividends in an account for the investor who may choose to reinvest those funds.

The system monitors the market price of the selected security at all times. Once the target sell price is reached, the system immediately begins to sell the shares of the selected security and continues to do so as long as the market price remains at or above the target sell price. The proceeds of this sale are immediately reinvested according to the method described above. That is, the system selects a second security within the selected index which is trading closest to, or at, its 52 week high price. The system purchases shares of the second selected security with funds available from the sale of the first selected security. In the event that more than one security within the selected index is trading at its 52 week high, the system selects the security least weighted in the existing or overall portfolio in attempt to broaden diversification It should be understood that any dividends received by the investor from the purchase of the first selected security, as well as any additional funds deposited by the investor, may be invested at the time the second selected security is purchased according to the present system and method if so desired.

Figure 5:
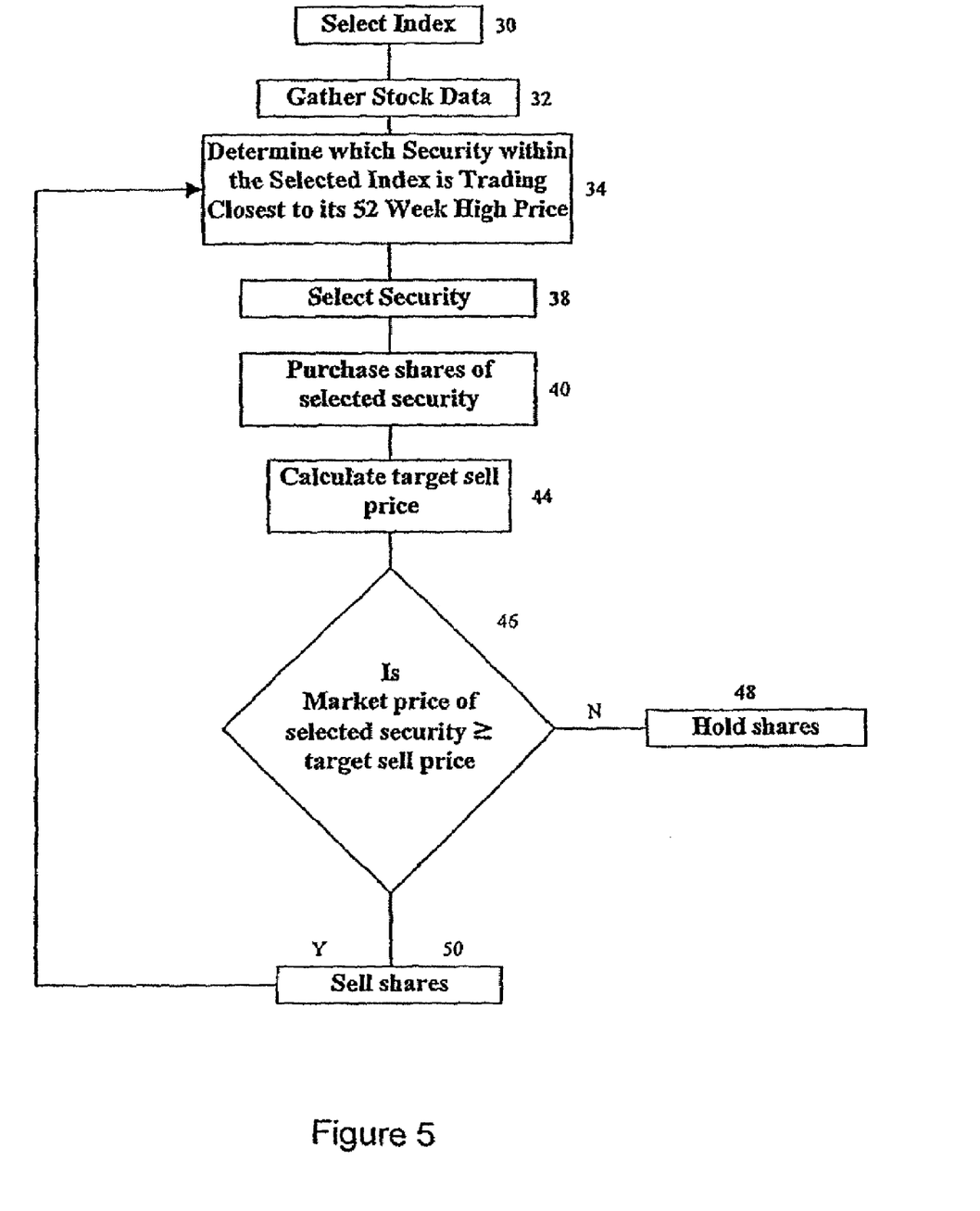
FIG. 5 shows a process flow according to an alternate embodiment of the present invention.

FIG. 5 shows a flow diagram of certain embodiments of the present invention. Block 30 indicates that an index is selected. Data for each of the securities within the index is gathered by the system at block 32. The system continually monitors information related to securities through data feeds such as the Internet or other data or telecommunication networks. Block 34 indicates that the system determines which security is trading closest to its 52 week high price. The system selects a first security at block 38 and purchases the first selected security at block 40. The system determines a target sell price at block 44, which may be 22.5% or some other percentage above the purchase price. The system continually monitors the price of the first selected security and compares it to the target sell price in block 46. Block 48 shows that the system holds the security as long as the market price is below the target sell price. When the market price reaches the target sell price, the system automatically sells the first selected security at block 50. The system selects a second security and reinvests the proceeds from the sale of the first selected security according to the system and methods of certain embodiments of the present invention. FIG. 6 is a chart showing hypothetical funds invested according to this embodiment.

In another embodiment of the present invention, the previously described models may be blended. An investor may make an initial deposit with the system, which is divided into four shares, which may be equal. Two of these shares are invested by the system according to a first blended model and the remaining two shares are invested according to a second blended model.

In an example of the present embodiment, an investor initially deposits $20,000 with the system provider. The system allocates $10,000, or two equal shares, for investment in the first blended model. For each security within the selected index, the system calculates the percentage difference of the current market price for each security from its 52 week high price. According to the first blended model, $5,000 is used to purchase a first major selected security, from the selected index, which is trading at the greatest percentage difference from its 52 week high price. In the first blended model, $5,000 is also used to purchase a first minor selected security from the selected index which is trading closest to its 52 week high price. The system calculates a target sell price for the first major selected security, which in the first blended model is a twenty percent increase over the purchase price. The system continually monitors the price of the first major selected security until it reaches the target sell price. When the target sell price for the first major selected security is reached, the system automatically sells the first major selected security and the first minor selected security. The market price of the first minor selected security is not considered. Using the proceeds from these sales, the system then purchases a second major selected security, which is trading at the greatest percentage difference from its 52 week high price, and also a second minor selected security which is trading closest to its 52 week high price. The system again sets a target sell price for the second major selected security, which is twenty percent greater than its purchase price. When this price is reached, the system automatically sells both the second major selected security and the second minor selected security. The proceeds of the sale are reinvested according to the system and method of the first blended model as described above.

In the present example, $10,000 is also allocated towards a second blended model. According to the second blended model, $5,000 is used to purchase a first major selected security, from the selected index, that is trading closest to its 52 week high price. An additional $5,000 is used to purchase a first minor selected security, which is the security within the selected index that is trading at the greatest percentage difference from its 52 week high price. The system calculates a target sell price for the first major selected security, which in the second blended model is a 22.5% increase over the purchase price. The system continually monitors the price of the first major selected security until it reaches the target sell price. When the target sell price for the first major selected security is reached, the system automatically sells the first major selected security and the first minor selected security. The market price of the first minor selected security is not considered. Using the proceeds from these sales, the system then purchases a second major selected security, which is trading closest to its 52 week high, and a second minor selected security, which is trading at the greatest percentage difference from its 52 week high price. The system again sets a target sell price for the second major selected security, which is 22.5% greater than its purchase price. When this price is reached, the system automatically sells both the second major selected security and the second minor selected security. The proceeds of the sale are reinvested according to the system and method of the second blended model as described above.

Figure 7:
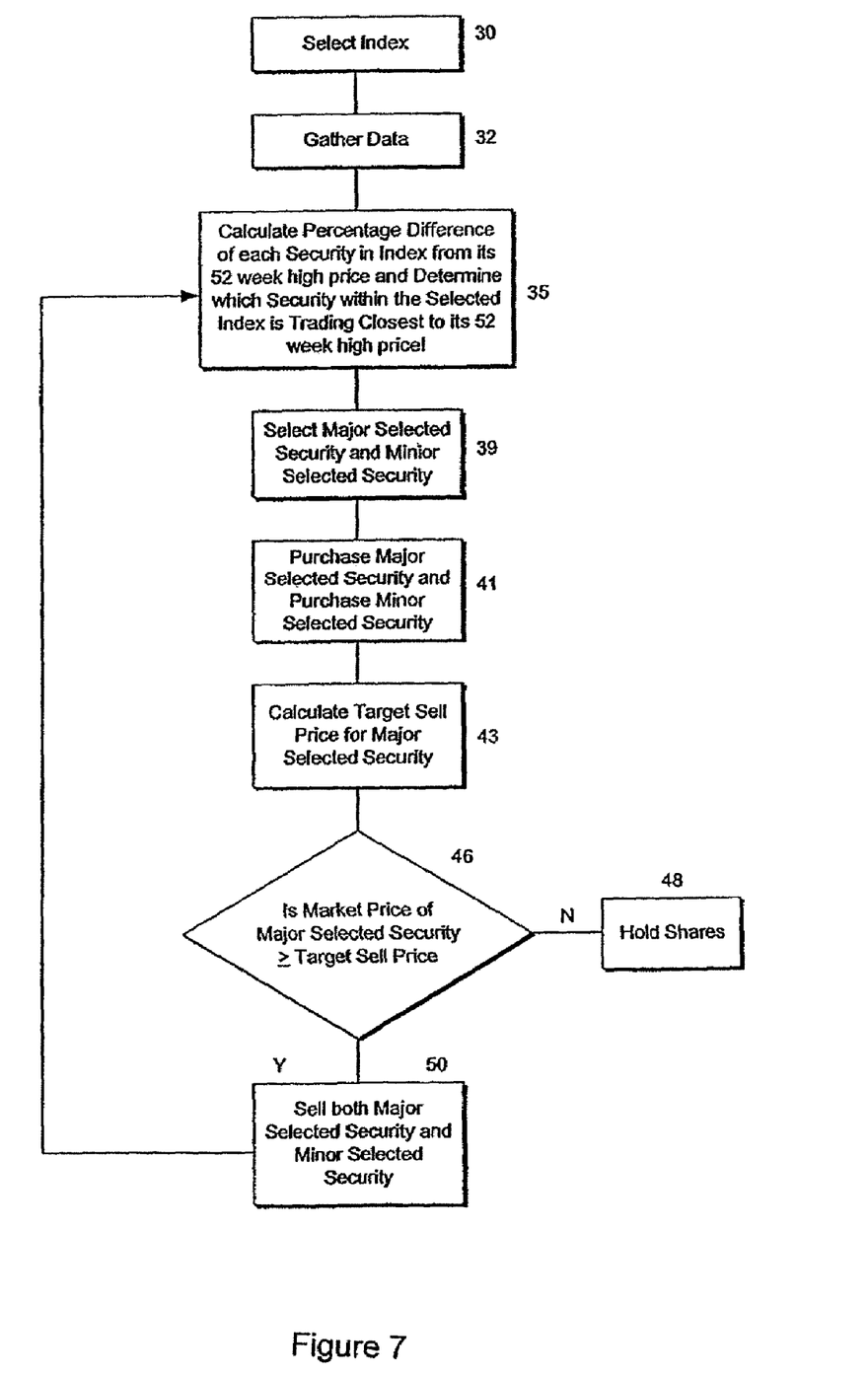
FIG. 7 shows a process flow according to an alternate embodiment of the present invention.

FIG. 7 is a process flow diagram depicting certain embodiments of the present invention. FIG. 8 is a chart showing hypothetical funds invested according to certain embodiments of the present invention.

It should be understood that while the above example shows the initial investment divided into four equal shares, this is not required for certain embodiments of the present invention. The amount of funds allocated to the first blended model and the second blended model, as well as the purchase of major and minor securities within each model, may be weighted to achieve desirable results. It should also be understood that the above described percentage increase in calculating the target sell prices for the first and second blended models may vary.

Any of the above embodiments may include a sell stop, for example the system may be required to sell the selected security when it decreases in value by a pre-selected percentage, and other option related strategies to more readily purchase and sell selected securities and protect investor value. It should also be understood that certain embodiments of the present invention may also include short selling of selected securities.

It should be understood that any of the above described methods may be performed using metrics other than the share price of the securities. For example, price to earning ratio (P/E) may be used to purchase securities according to certain embodiments of the present invention. The price to earnings ratio is the relationship between the price of a stock and its earnings per share and may be calculated for each security by dividing the stock price by the earnings per share. In certain embodiments of the present invention, the above described methods may be used to purchase and sell securities within an index by determining the particular securities within the selected index which have a price to earnings ratio that is the least or greatest percentage removed from its 52 week high price to earnings ratio value.

In other embodiments according to the present invention, the previously described methods may be used to purchase and sell securities within an index by determining the particular securities within the selected index which have a price to book ratio (Prc/Bk) that is the least or greatest percentage removed from its 52 week high price to book ratio value. The price to book ratio of a security is calculated by dividing the stock price by the book value per share.

In certain embodiments of the present invention, the foregoing methods may be used to purchase and sell securities within an index by determining the particular securities within the selected index which have a price to sales ratio (Prc/Sls) that is the least or greatest percentage removed from its 52 week high price to sales ratio value. The price to sales ratio is determined by dividing the stock price by the sales per share. The average shares outstanding is typically used when calculating the sales pre share.

According to certain embodiments of the invention, the above described methods may be used to purchase and sell securities within an index by determining the particular securities within the selected index which have a price to cash flow ratio (Prc/CF) that is the least or greatest percentage removed from its 52 week high price to cash flow ratio value. The price to cash flow ratio is determined by dividing the stock price by the cash flow per share. The average shares outstanding is typically used when calculating the cash flow per share.

According to certain embodiments of the invention, the previously described methods may be used to purchase and sell securities within an index by determining the particular securities within the selected index which have a dividend yield that is the least or greatest percentage removed from its 52 week high dividend yield value. The dividend yield is determined by dividing the gross dividends per share payments paid over the prior twelve months by the current stock price.

According still to other embodiments of the present invention, the foregoing methods may be used to purchase and sell securities within an index by determining price to EBITDA (Earnings Before Interest, Taxes, Deductions, and Amortization) that is the least or greatest percentage removed from its 52 week high price to EBITDA ratio value. EBITDA is the sum of operating income and depreciation and amortization.

What is claimed is:

1. A computerized method of selecting a security for purchase and for sale, the method comprising:
    selecting an index of a plurality of securities for investment of funds;
    gathering data from financial data service providers on each security included in the index, the data comprising current price to earnings ratio of each security and the 52-week high price to earnings ratio;
    determining, by a computer, the percentage difference between the current price to earnings ratio and the 52-week high price to earnings ratio for each security within the index;
    selecting at least one security for purchase based on the difference between the current price to earnings ratio and the 52-week high price to earnings ratio of the security, wherein the selected security is the security within the index that is trading at the greatest percentage difference between the current price to earnings ratio and the 52-week high price to earnings ratio;
    purchasing shares of the selected security;
    determining, by a computer, a target sell price for the selected security based on a pre-selected percentage increase above the purchase price;
    comparing, by a computer, the current market price of the selected security with the target sell price; and
    selling the selected security when the current market price reaches the target sell price.

2. The method according to claim 1 further comprising purchasing a second selected security with at least some of the proceeds of the sale of the first selected security and calculating a target sell price for the second selected security.

3. A computerized method of selecting a security for purchase and for sale, the method comprising:
    selecting an index of a plurality of securities for investment of funds;
    gathering data from financial data service providers on each security included in the index, the data comprising current price to book ratio of each security and the 52-week high price to book ratio;
    determining, by a computer, the percentage difference between the current price to book ratio and the 52-week high price to book ratio for each security within the index;
    selecting at least one security for purchase based on the difference between the current price to book ratio and the 52-week high price to book ratio of the security, wherein the selected security is the security within the index that is trading at the greatest percentage difference between the current price to book ratio and the 52-week high price to book ratio;
    purchasing shares of the selected security;
    determining, by a computer, a target sell price for the selected security based on a pre-selected percentage increase above the purchase price;
    comparing, by a computer, the current market price of the selected security with the target sell price; and
    selling the selected security when the current market price reaches the target sell price.

4. The method according to claim 3 further comprising purchasing a second selected security with at least some of the proceeds of the sale of the first selected security and calculating a target sell price for the second selected security.

5. A computerized method of selecting a security for purchase and for sale, the method comprising:
    selecting an index of a plurality of securities for investment of funds;
    gathering data from financial data service providers on each security included in the index, the data comprising current price to sales ratio of each security and the 52-week high price to sales ratio;
    determining, by a computer, the percentage difference between the current price to sales ratio and the 52-week high price to sales ratio for each security within the index;
    selecting at least one security for purchase based on the difference between the current price to sales ratio and the 52-week high price to sales ratio of the security, wherein the selected security is the security within the index that is trading at the greatest percentage difference between the current price to sales ratio and the 52-week high price to sales ratio;
    purchasing shares of the selected security;
    determining, by a computer, a target sell price for the selected security based on a pre-selected percentage increase above the purchase price;
    comparing, by a computer, the current market price of the selected security with the target sell price; and
    selling the selected security when the current market price reaches the target sell price.

6. The method according to claim 5 further comprising purchasing a second selected security with at least some of the proceeds of the sale of the first selected security and calculating a target sell price for the second selected security.

7. A computerized method of selecting a security for purchase and for sale, the method comprising:
    selecting an index of a plurality of securities for investment of funds;
    gathering data from financial data service providers on each security included in the index, the data comprising current price to cash flow ratio of each security and the 52-week high price to cash flow ratio;
    determining, by a computer, the percentage difference between the current price to cash flow ratio and the 52-week high price to cash flow ratio for each security within the index;

selecting at least one security for purchase based on the difference between the current price to cash flow ratio and the 52-week high price to cash flow ratio of the security, wherein the selected security is the security within the index that is trading at the greatest percentage difference between the current price to cash flow ratio and the 52-week high price to cash flow ratio;

purchasing shares of the selected security;

determining, by a computer, a target sell price for the selected security based on a pre-selected percentage increase above the purchase price;

comparing, by a computer, the current market price of the selected security with the target sell price; and selling the selected security when the current market price reaches the target sell price.

8. The method according to claim 7 further comprising purchasing a second selected security with at least some of the proceeds of the sale of the first selected security and calculating a target sell price for the second selected security.

9. A computerized method of selecting a security for purchase and for sale, the method comprising:

selecting an index of a plurality of securities for investment of funds;

gathering data from financial data service providers on each security included in the index, the data comprising current price to EBITDA ratio of each security and the 52-week high price to EBITDA ratio;

determining, by a computer, the percentage difference between the current price to EBITDA ratio and the 52-week high price to EBITDA ratio for each security within the index;

selecting at least one security for purchase based on the difference between the current price to EBITDA ratio and the 52-week high price to EBITDA ratio of the security, wherein the selected security is the security within the index that is trading at the greatest percentage difference between the current price to EBITDA ratio and the 52-week high price to EBITDA ratio;

purchasing shares of the selected security;

determining, by a computer, a target sell price for the selected security based on a pre-selected percentage increase above the purchase price;

comparing, by a computer, the current market price of the selected security with the target sell price; and selling the selected security when the current market price reaches the target sell price.

10. The method according to claim 9 further comprising purchasing a second selected security with at least some of the proceeds of the sale of the first selected security and calculating a target sell price for the second selected security.

11. A computerized method of selecting a security for purchase and for sale, the method comprising:

selecting an index of a plurality of securities for investment of funds;

gathering data from financial data service providers on each security included in the index, the data comprising current dividend yield of each security and the 52-week high dividend yield;

determining, by a computer, the percentage difference between the current dividend yield and the 52-week high dividend yield for each security within the index;

selecting at least one security for purchase based on the difference between the current dividend yield and the 52-week high dividend yield of the security, wherein the selected security is the security within the index that is trading at the greatest percentage difference between the current dividend yield and the 52-week high dividend yield;

purchasing shares of the selected security;

determining, by a computer, a target sell price for the selected security based on a pre-selected percentage increase above the purchase price;

comparing, by a computer, the current market price of the selected security with the target sell price; and selling the selected security when the current market price reaches the target sell price.

12. The method according to claim 11 further comprising purchasing a second selected security with at least some of the proceeds of the sale of the first selected security and calculating a target sell price for the second selected security.

* * * * *